Patented Jan. 12, 1926.

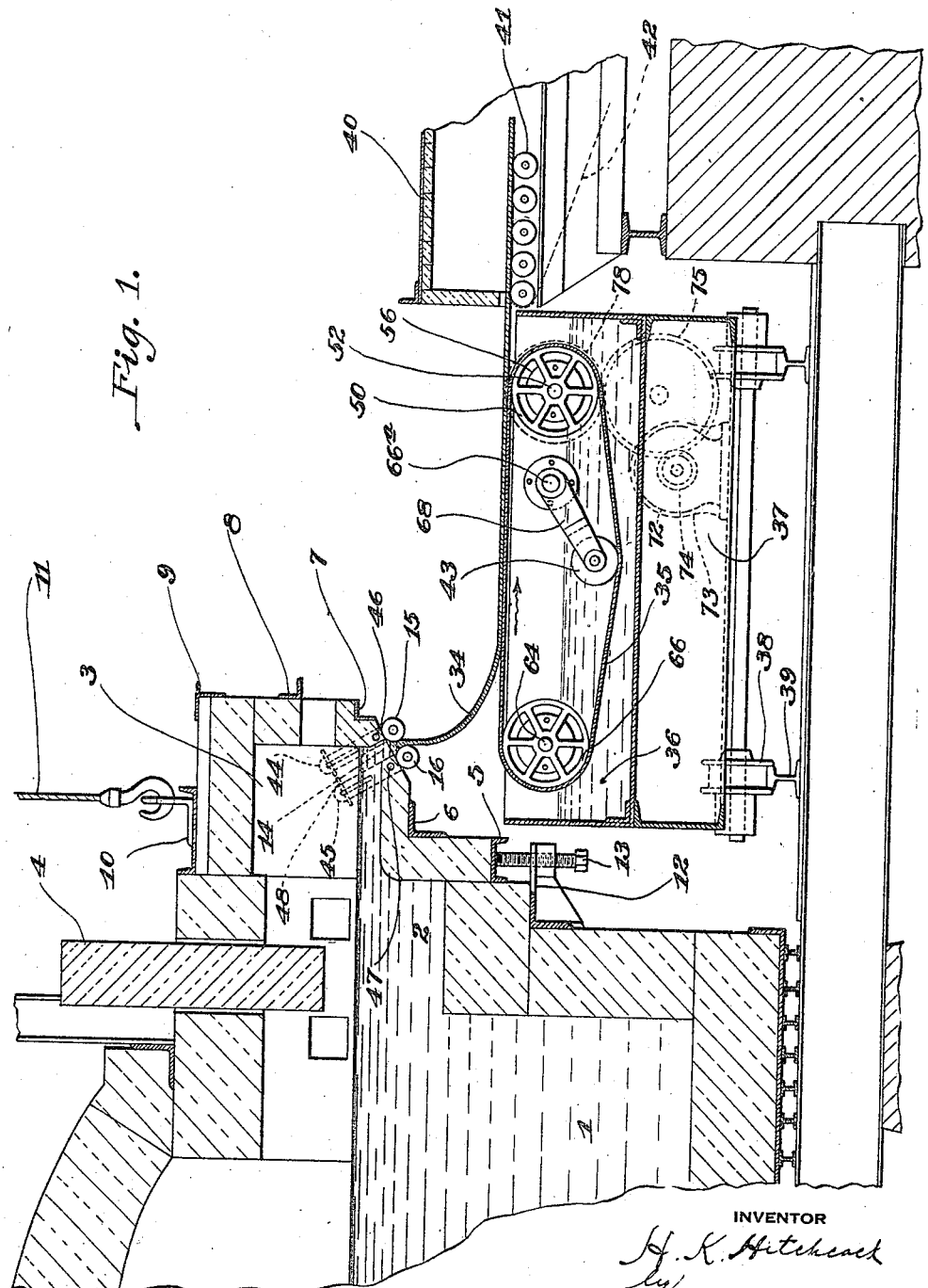

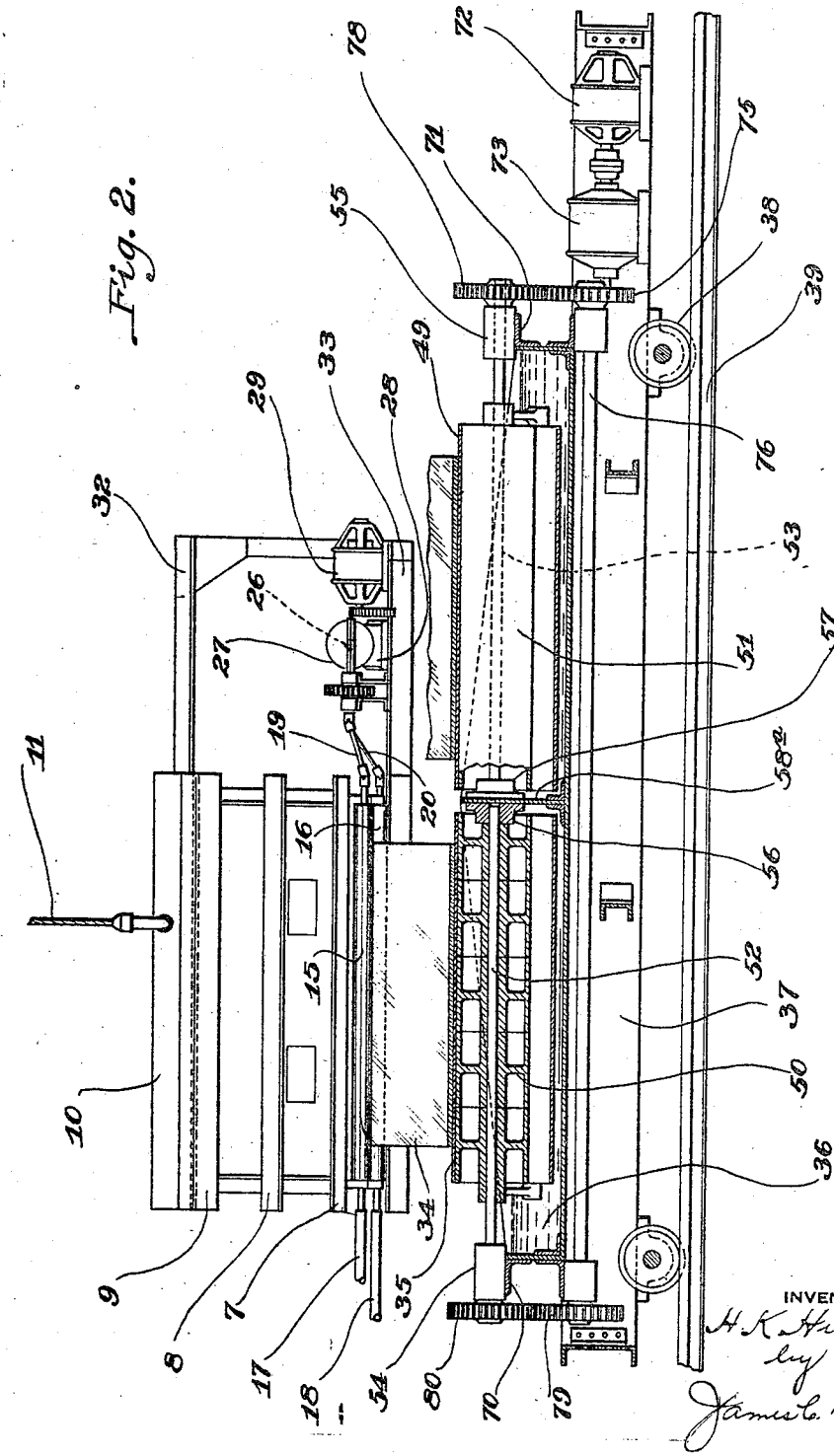

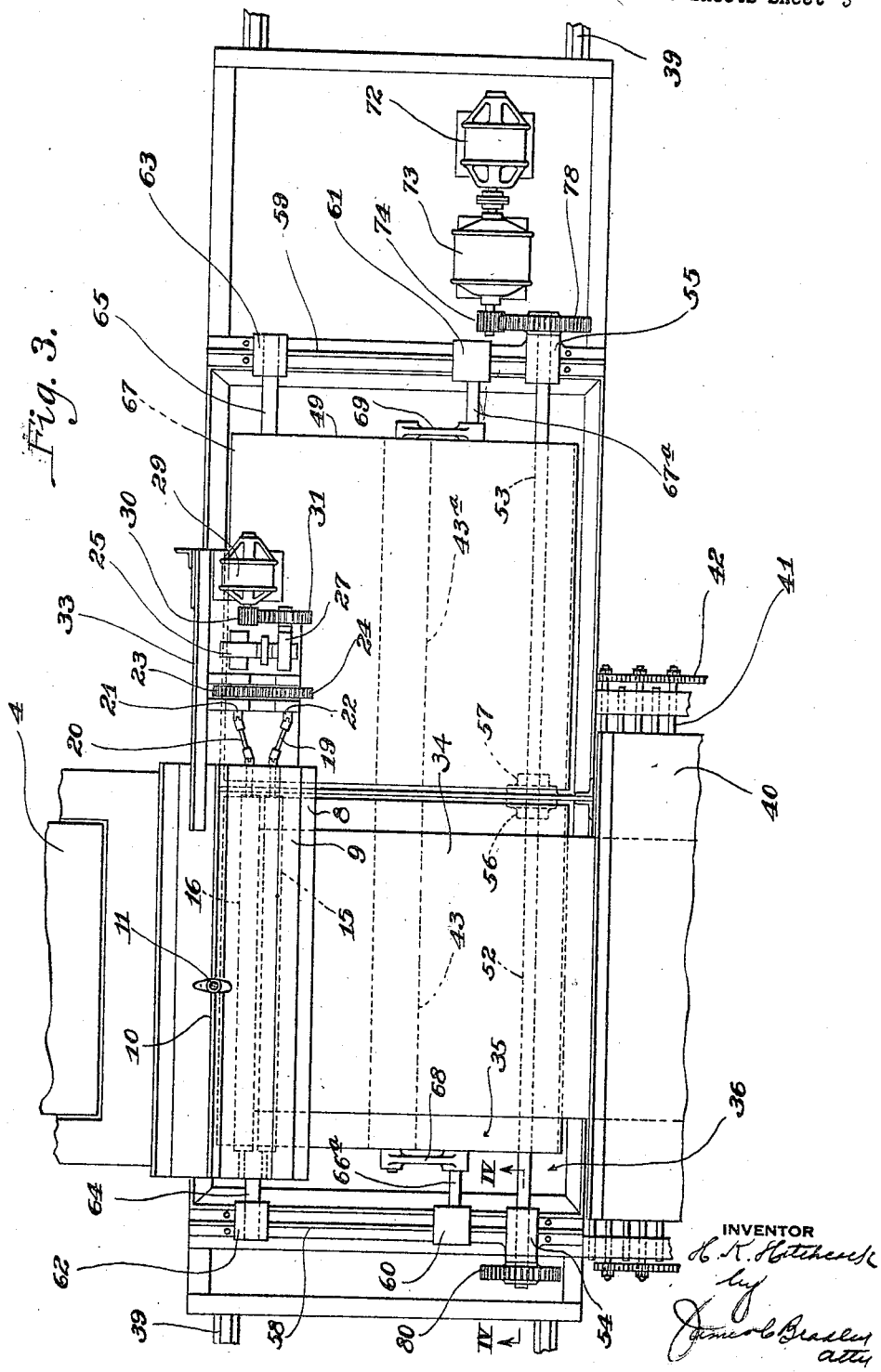

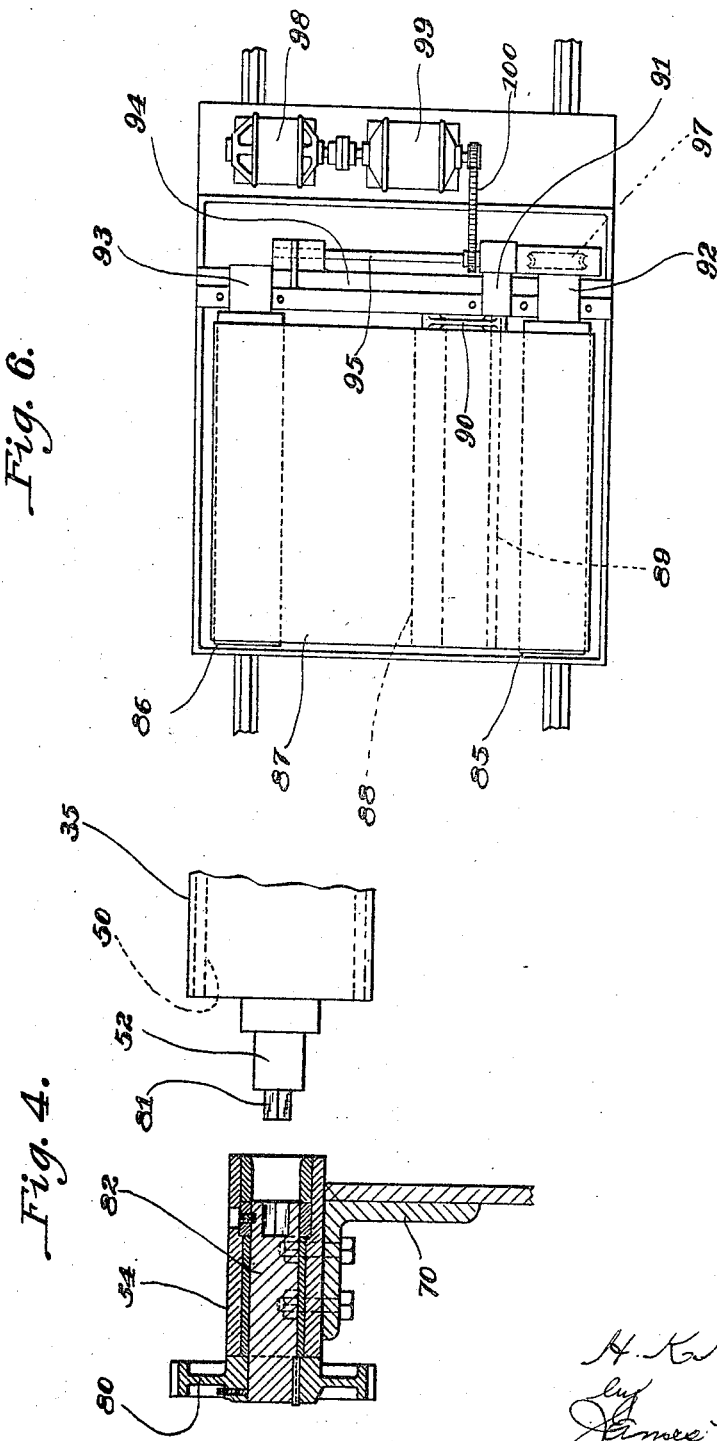

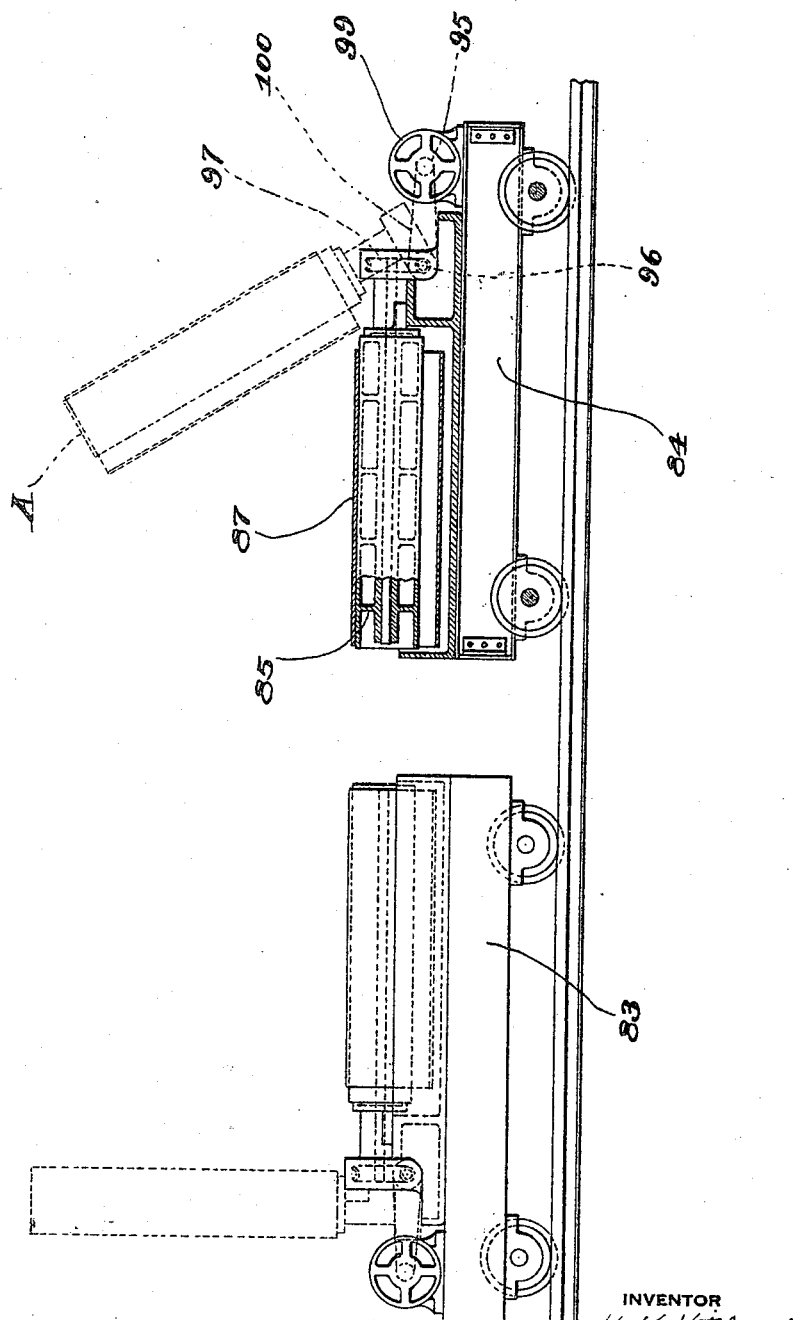

1,569,086

UNITED STATES PATENT OFFICE.

HALBERT K. HITCHCOCK, OF PITTSBURGH, PENNSYLVANIA, ASSIGNOR OF ONE-HALF TO HITCHCOCK EXPERIMENT COMPANY, A CORPORATION OF NEW JERSEY.

APPARATUS FOR MAKING SHEET GLASS.

Application filed December 8, 1923. Serial No. 679,347.

*To all whom it may concern:*

Be it known that I, HALBERT K. HITCHCOCK, a citizen of the United States, and a resident of Pittsburgh, in the county of Allegheny and State of Pennsylvania, have made a new and useful invention in Improvements in Apparatus for Making Sheet Glass, of which the following is a specification.

The invention relates to apparatus for making sheet glass continuously from a tank. It has for its principal objects, the provision of an improved apparatus of the kind specified which will produce fire polished sheet glass of high quality and which has a simple and effective means for receiving the sheet and transferring it to the leer without marring its lower surface. A further object is the provision of an endless belt receiving device having an improved arrangement for replacing the belt without any interruption to the operation for forming and annealing the continuously formed sheet or ribbon. Certain embodiments of the invention are illustrated in the accompanying drawings wherein:

Figure 1 is a vertical section through the apparatus. Fig. 2 is a front elevation. Fig. 3 is a plan view. Fig. 4 is an enlarged detail section on the line IV—IV of Fig 3. And Figs. 5 and 6 show a modification, Fig. 5 being a partial end elevation and partial vertical section, and Fig. 6 being a plan view of one half of the apparatus.

Referring to the tank construction illustrated in Fig. 1, 1 is the end of a melting tank which may be of any approved type, and 2 is a forehearth leading to the drawing chamber 3. A gate 4 operated from above serves to cut off the flow of gas when changes or repairs are being made in the drawing apparatus. The drawing chamber 3 is of refractory material mounted in a framework of commercial sections 5, 6, 7, 8, 9 and 10 and is suspended from above by means of the cable 11 which may be connected to a suitable crane for handling the drawing chamber when it is necessary to remove or replace it. In order to adjust the position of the drawing chamber, the bracket 12 is employed secured to the framework of the drawing tank and provided with a plurality of screws 13 which engage the lower face of the channel 5.

The drawing chamber is provided with an outlet slot 14 and opposite this outlet slot are a pair of rolls 15 and 16 for sizing the sheet of glass flowing from the slot 14. These rolls are spaced apart a distance greater than the thickness of the glass sheet to be formed, and the sheet or ribbon, after it passes the rolls, is reduced in thickness to the desired dimension by stretching preliminary to its entrance to the leer. The rolls are hollow and water cooled by means of a flow from the pipes 17 and 18 swiveled to the ends of the rolls (Fig. 2). The rolls are driven from the shafts 19 and 20, having universal joint connections at their ends with the ends of the rolls and with the ends of the driven shafts 21 and 22. The shafts carry the intermeshing spur gears 23 and 24, the gear 23 being driven from a worm wheel in the casing 25 which is engaged on its lower side by a suitable worm carried upon the transverse shaft 26. The shaft 26 also carries a worm wheel lying in the casing 27 which is driven from a worm in the casing 28 (Fig. 2). This last worm is driven from the motor 29 through the intermediary of the pinion 30 and spur gear 31, which latter is carried by the axle of the worm in the casing 28. The motor 29 and gear reduction as just described is carried upon the framework 32, 33, attached to the framework of the drawing chamber so that the drawing chamber and drive mechanism may be moved as a unit.

The glass sheet 34 is received upon an endless belt 35, preferably of cotton duck or asbestos and having its lower flight located in a tank 36 provided with a bath of water. This tank and the belt are carried upon the truck framework 37 provided with suitable wheels 38 engaging the rails 39 so that the entire apparatus may be moved laterally when it becomes necessary to change the belt as hereinafter described. The belt is driven by suitable mechanism later described and discharges into the tunnel leer 40 provided with rollers 41 for receiving the glass sheet or ribbon, the ends of the rolls being provided with suitable sprockets driven from a chain 42. Any other type of leer might be employed, but one of the roller type is preferred. The belt 35 is maintained tight by means of the idler 43 so that the upper flight of the belt is substantially flat and level. In order to adjust the thickness of the glass sheet, the rolls 15 and 16 are mounted upon lever arms 44 and 45 pivoted at 46 and 47, the outer ends of such levers being connected by a suitable screw adjusting member 48 working through blocks carried by the lever ends. The glass ribbon in passing from the rolls 15 and 16 to the belt assumes a curve somewhat as indicated in Fig. 1, and the distance from the rolls to the belt and the temperature of the glass are so adjusted that in the period of movement from the rolls to the belt, the glass is stretched and reduced in thickness to its final dimension and its lower surface, by the time it reaches the belt has attained a degree of hardness such that it will not be marred by contact with the wet fabric belt. The glass at this time is not completely set, although the surfaces of the sheet are harder than the interior portion, so that the glass is still slightly flexible and readily flattens out upon the belt. The moisture in the belt produces a film of steam when the glass comes into contact with the belt which film of steam still further reduces any tendency of the glass to become marred by reason of its contact with the belt. By the time the sheet leaves the belt, it is substantially set and practically flat.

In order to provide for the replacement of the belt 35 without interfering with the operation, a second belt 49 is provided upon the truck 37. This belt is similar to the belt 35 and is cooled by passing it through the bath of water in the same manner. The two belts pass at their rear ends around the drums 50 and 51 carried by the shafts 52 and 53 (Fig. 2). These shafts are journaled at their outer ends in the bearings 54 and 55 and at their inner ends in the bearings 56 and 57 carried by the wall 58$^a$ at the center of the tank. The bearings 54 and 55 each constitute a part of the removable castings 58 and 59, which castings are provided with the bearings 60 and 61 and 62 and 63, the latter bearings serving to support the outer ends of the shafts 64 and 65 which carry the drums 66 and 67 at the forward ends of the belts. These shafts 64 and 65 are carried at their inner ends in bearings corresponding to the bearings 56 and 57 and are supported upon the wall 58. The bearings 60 and 61 carry the outer ends of the shafts 66$^a$ and 67$^a$ whose inner ends are carried by suitable bearings similar to the bearings 56 and 57 and also mounted upon the central wall 58$^a$ of the tank. Pivoted upon these shafts are the idler rolls 43 and 43$^a$ for keeping the belts tight, such rollers being connected to the shafts 66$^a$ and 67$^a$ by means of the arms 68 and 69, a pair of similar arms being, of course, provided at the inner ends of the rolls. The three sets of bearings 54 and 55, 60 and 61, and 62 and 63 are carried by the castings 58 and 59 so that the entire set of bearings at each end may be removed at one time in order to permit of the removal of the belts which is accomplished by slipping the belts out endwise over the ends of the shafts after the casting provided with the bearings is removed. The castings 58 and 59 are secured removably in position upon the tops of the angles 70 and 71 (Fig. 2) by means of bolts.

The driving of the two belts is accomplished from the motor 72 which operates through suitable reducing mechanism in the casing 73 to drive the pinion 74, which in turn engages the gear 75 mounted on the shaft 76. The gear 75 meshes with a gear 78 carried by the drum shaft 53, thus providing a drive for the belt 49. The other belt 35 is driven from the shaft 76 through the intermediary of the gears 79 and 80 at the left hand ends of the shafts 76 and 52. An independent drive for the belts is thus provided, so that, while one belt is being removed, there is no interference with the drive of the other belt. In order to provide for the ready removal of the gear 78 when it is desired to remove the belt 35, the construction shown in Fig. 4 is preferably employed. The end of the shaft 52 is provided with a reduced end 81, square in cross section which fits into a socket in the end of the stub shaft 82 which carries the gear 80. When the bolts which hold the casting 58 in position are removed, this casting with the three bearings 54, 60 and 62 and the gear 80 may be readily removed by a movement longitudinally of the shaft 52 to the left (Fig. 2), thus leaving the ends of the shafts 52, 66$^a$ and 64 free so that the belt 35 may be readily slipped off of its drums. The construction at the right hand end of the belt 49 and including the bearings 55, 61 and 63 is the same as that just described at the left hand side of the belt 35, thus providing for the removal of the belt 49 in a similar manner.

With the parts in the position indicated in Fig. 3, when it becomes necessary to replace the belt 35 by the belt 49, the truck is moved to the left gradually on its track without interfering with the drawing operation, the belt 35 being shifted from beneath the glass as the belt 49 is shifted into position beneath the glass. This movement is continued until the glass sheet is entirely transferred to the belt 49 which brings the belt 35 to a position at the left of that illustrated in Fig. 3, and far enough removed from the heat so that the operation of replacing the belt 35 can be conveniently accomplished. As heretofore indicated, this is done by unbolting the casting 58 and slipping such member off endwise, leaving the ends of the shafts 54, 66ª and 64 free, after which the belt can be slipped off over these ends and a new belt slipped into position. When the belt 49 becomes worn and needs replacement, the operation is reversed, the truck being moved to the right to bring the belt 49 to one side of the line of operation and the belt 35 back to the position illustrated, after which the belt 49 may be removed and replaced by an operation similar to the one just described in connection with the belt 35.

Figs. 5 and 6 illustrate a modified form of arrangement for securing a shifting of belts and without interrupting the operation. In this construction, there are two independent trucks 83 and 84, each carrying a driven belt for performing the function of the belts 35 and 49 of the first type of construction. The two trucks and the mechanism carried thereby are the same so that a description of one will be sufficient for both. The apparatus includes the pair of drums 85 and 86, around which the fabric belt 87 extends and intermediate the drums is an idler 88 bearing against the lower flight of the belt for keeping the upper flight under tension and relatively flat as in the other type of construction. The idler is pivoted to a transverse shaft 89 by means of the arms 90. The shaft 89 and the shafts which carry the drums 85 and 86 are journaled in the bearings 91, 92 and 93 carried by the casting 94, and such casting is pivoted for tilting movement on the shaft 95 so that the two drums carrying the belt may be tilted as indicated at A in Fig. 5, and in such position the belt may be readily slipped off of the drums. The shaft 95 carries a worm 96 meshing with the worm wheel 97, and this worm wheel is keyed to the axle of the drum 85. The shaft 95 is driven from the motor 98 through the intermediary of the reduction gearing in the casing 99 and the sprocket chain 100 which passes around suitable sprockets on the drive shaft leading from the reduction gearing and on the shaft 95. When it is desired to shift the operation from the belt on one truck to that on the other, the two trucks are together shifted laterally to carry the belt to be replaced from beneath the glass sheet and at the same time bring the new belt into position beneath the sheet. After this movement is completed, the truck containing the worn belt may be removed as far as may be convenient from the drawing apparatus and the belt removed and replaced after the drums are tilted as heretofore explained. Each truck is provided with its own tank carrying a supply of water through which the lower flight of the belt extends as in the construction of Figs. 1 to 4. This apparatus, while requiring two driving motors as opposed to the single driving motor of the construction of Figs. 1 to 4, has the advantage of being somewhat more easily operated, and the belts may be more comfortably replaced and repaired because the truck which carries the belt to be repaired can be removed farther from the drawing apparatus than is the case in the construction of Figs. 1 to 4.

The use of the liquid bath permits the use of a belt of a material other than asbestos, if desired, such as cotton duck. Such material is much stronger and more durable than asbestos and cheaper, and may be used under any desired degree of tension which may be necessary to keep the top flight of the belt substantially flat.

The belt may be driven at a speed which is greater or less than the movement of the glass in which case a smoothing or marvering effect is secured. The belt may be treated with wax, which is particularly desirable when the glass is thin and a very fine surface is required. The speed of draw and thickness of the sheet may be controlled by varying the amount of cooling effected by the rollers 15 and 16 and by varying the distance between such rolls and the endless receiving belt.

What I claim is:

1. In apparatus for forming sheet glass, a glass container adapted to carry a bath of molten glass and having a downwardly directed outlet slot through which a continuous sheet or ribbon is adapted to discharge by gravity, a laterally extending endless belt of woven fabric in position to receive the ribbon, and a cooling bath through which the belt is passed.

2. In apparatus for forming sheet glass, a glass container adapted to carry a bath of molten glass and having a downwardly directed outlet slot through which a continuous sheet or ribbon is adapted to discharge by gravity, a leer having its receiving end adjacent the outlet slot, an endless belt of woven fabric between the slot and leer in position to receive the ribbon, and a cooling bath through which the belt is passed.

3. In apparatus for forming sheet glass, a glass container adapted to carry a bath of molten glass and having a downwardly directed outlet slot through which a continuous sheet or ribbon is adapted to discharge by gravity, a laterally extending endless asbestos belt in position to receive the ribbon, and a cooling bath through which the belt is passed.

4. In apparatus for forming sheet glass, a glass container adapted to carry a bath of molten glass and having a downwardly directed outlet slot through which a continuous sheet or ribbon is adapted to discharge by gravity, a leer having its receiving end adjacent the outlet slot, an endless belt between the slot and leer in position to receive the ribbon, a laterally movable car or truck on which the belt is carried, and a cooling bath carried by the truck through which the belt passes.

5. In apparatus for forming sheet glass, a glass container adapted to carry a bath of molten glass and having a downwardly directed outlet slot through which a continuous sheet or ribbon is adapted to discharge by gravity, a pair of rolls at the outlet end of the slot spaced apart a distance greater than the thickness of the ribbon to be produced, a laterally extending endless belt in position to receive the ribbon and spaced below the rolls a distance such that the ribbon is stretched and reduced in thickness and sets to such an extent that it will not mar by the time it engages the belt, and means for cooling the lower flight of the belt.

6. In apparatus for forming sheet glass, a glass container adapted to carry a bath of molten glass and having a downwardly directed outlet slot through which a continuous sheet or ribbon is adapted to discharge by gravity, a laterally extending endless belt in position to receive the ribbon, and a second similar endless belt alongside the first belt, the belts being supported for movement transversely of the ribbon, so that both belts may be moved laterally to carry the first belt from beneath the ribbon as the second belt moves into position beneath it.

7. In apparatus for forming sheet glass, a glass container adapted to carry a bath of molten glass and having a downwardly directed outlet slot through which a continuous sheet or ribbon is adapted to discharge by gravity, a laterally extending endless belt in position to receive the ribbon, a second similar endless belt alongside the first belt, and supporting means mounted for movement transversely of the ribbon on which the belts are mounted.

8. In apparatus for forming sheet glass, a glass container adapted to carry a bath of molten glass and having a downwardly directed outlet slot through which a continuous sheet or ribbon is adapted to discharge by gravity, a laterally extending endless belt in position to receive the ribbon, a second similar endless belt alongside the first belt, supporting means for the belts mounted for movement transversely of the ribbon, and driving means for the belts carried by the supporting means.

9. In apparatus for forming sheet glass, a glass container adapted to carry a bath of molten glass and having a downwardly directed outlet slot through which a continuous sheet or ribbon is adapted to discharge by gravity, a laterally extending endless belt in position to receive the ribbon, a second similar endless belt alongside the first belt, supporting means for the belts mounted for movement transversely of the ribbon, and driving means for the belts, and cooling means therefor carried by the supporting means.

10. In apparatus for forming sheet glass, a glass container adapted to carry a bath of molten glass and having a downwardly directed outlet slot through which a continuous sheet or ribbon is adapted to discharge by gravity, a laterally extending endless belt of fabric in position to receive the ribbon, and a cooling bath through which the belt is passed.

11. In apparatus for forming sheet glass, a glass container adapted to carry a bath of molten glass and having a downwardly directed outlet slot through which a continuous sheet or ribbon is adapted to discharge by gravity, a laterally extending endless belt in position to receive the ribbon, a cooling bath through which the belt is passed, and means for driving the belt at a speed such that it moves relatively to the ribbon supported thereon.

12. In apparatus for forming sheet glass, a glass container adapted to carry a bath of molten glass and having a downwardly directed outlet slot through which a continuous sheet or ribbon is adapted to discharge by gravity, a laterally extending endless belt in position to receive the ribbon, a cooling bath through which the belt is passed, and means for driving the belt at a speed which is greater than that of the ribbon supported thereon.

In testimony whereof, I have hereunto subscribed my name this 7th day of December, 1923.

HALBERT K. HITCHCOCK